F. McMAHON AND R. A. HOUSTON.
SCREEN FOR WINDSHIELDS.
APPLICATION FILED AUG. 22, 1919.
1,346,664. Patented July 13, 1920.
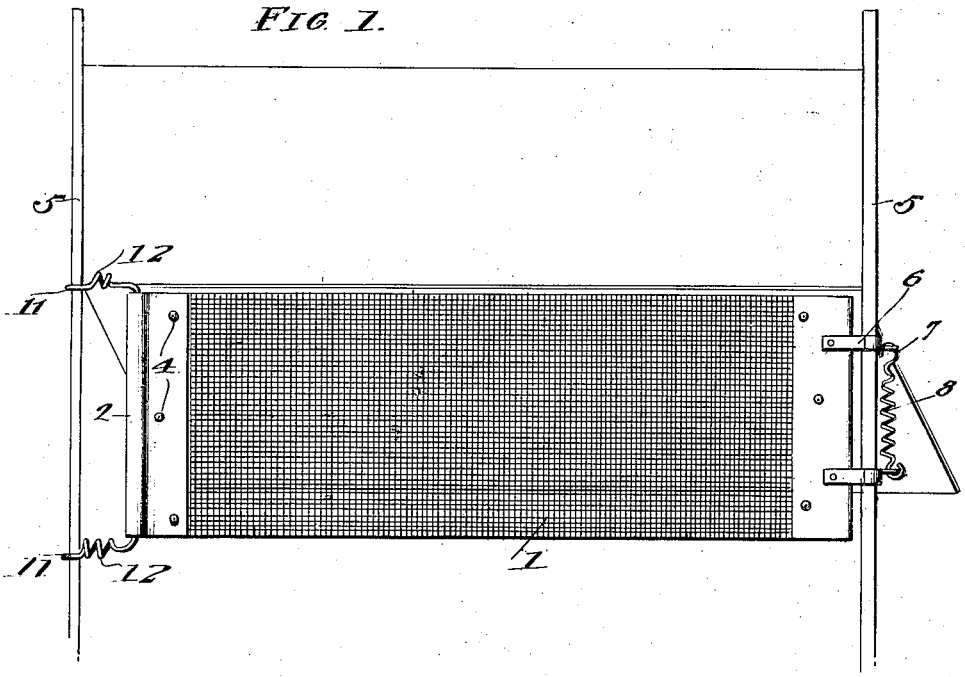
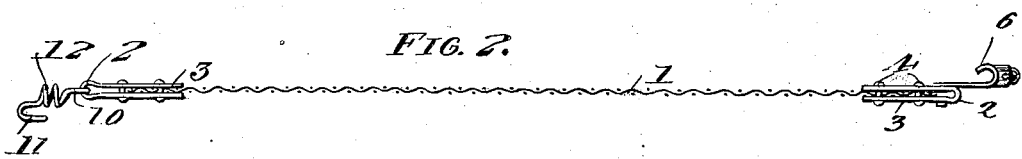
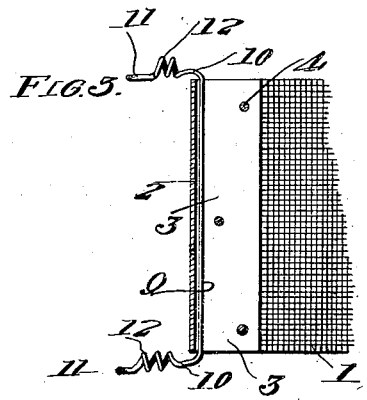
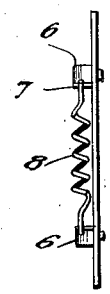
WITNESSES
INVENTORS
FRANK MCMAHON,
ROGER A. HOUSTON,
BY
ATTORNEYS

UNITED STATES PATENT OFFICE.

FRANK McMAHON AND ROGER A. HOUSTON, OF SOUTH CHARLESTON, OHIO.

SCREEN FOR WINDSHIELDS.

1,346,664.     Specification of Letters Patent.     Patented July 13, 1920.

Application filed August 22, 1919. Serial No. 319,264.

*To all whom it may concern:*

Be it known that we, FRANK MCMAHON and ROGER A. HOUSTON, both citizens of the United States, and residents of South Charleston, in the county of Clark and State of Ohio, have invented certain new and useful Improvements in Screens for Windshields, of which the following is a specification.

Our invention is an improvement in screens for windshields, and has for its object to provide a device of the character specified, wherein a perforate curtain is provided, having means at its ends for permitting it to be connected to the windshield supporting frame of a motor vehicle, to prevent the passage of bugs and the like when the shield is open.

In the drawings:—

Figure 1 is a front view of a windshield with the improved screen in place,

Fig. 2 is a top plan view,

Fig. 3 is a vertical section in the plane of the shield at one end thereof,

Fig. 4 is an end view looking at the right end of Fig. 1.

In the present embodiment of the invention, the improved screen comprises a sheet 1 of perforate material, as for instance, wire cloth, and the ends of the sheet are connected to substantially U-shaped plates, the said plates consisting of sheets doubled upon themselves to form a cylindrical body 2, and sides 3 lapping upon the sheet 1. These plates are secured to the sheet 1 by means of rivets 4 or the like, and means is provided in connection with each of the tubular bodies 2 of the plate for connecting the screen to the windshield supporting brackets 5.

The means at one end of the screen is a yoke formed from wire, the body 9 of the yoke engaging the tubular portion 2 of the plate, while the arms of the yoke have hooks 11 for engaging the bracket 5 which supports a windshield at that end. A coil 12 is interposed in the length of each arm, the said coil imparting resiliency to the arm to facilitate the placing of the screen and to hold it taut.

At the opposite end, the securing means is a pair of hooks 6, the said hooks being secured to one of the sides 3 of the plate 2—3, near the top and bottom of the said plate, as shown in Fig. 1. Each of the said hooks has an outwardly extending lug 7, and with each of these lugs there is engaged one end of a coil spring 8.

The spring acts normally to swing the free ends of the hooks toward each other, and when the hooks are engaged with the windshield supporting bracket 5 at said end, the spring acting as it does to draw the hooks toward each other will make friction between the windshield bracket and the hooks to prevent slipping movement of the hooks on the brackets.

In order to place the screen, the hooks 6 are engaged with one of the brackets, after which the hooks 11 are engaged with the other, or it may be oppositely engaged if desired. The coils 12 provide for some extension of the arms 10, so that the hooks may be easily engaged with the bracket.

We claim:—

1. A device of the character specified comprising a strip of flexible material, a substantially U-shaped connector at one end of the strip and comprising a body portion connected with the end of the strip and arms extending laterally from the body and having hooks for engaging the windshield brackets, the arms having coils interposed therein to provide resiliency, and hooks at the other end of the strip engaging the windshield bracket at the other side, and resilient means for normally forcing said hooks toward each other to cause them to frictionally engage the bracket.

2. A device of the character specified comprising a strip of flexible material having at one end a pair of hooks for engaging the windshield bracket at one side and having at the other a pair of hooks for engaging the bracket at the opposite side, and a spring arranged between the said last named hooks and normally acting to swing them in an angling position with respect to the bracket to cause them to tightly engage the bracket.

FRANK McMAHON.
ROGER A. HOUSTON.